Figure 1:
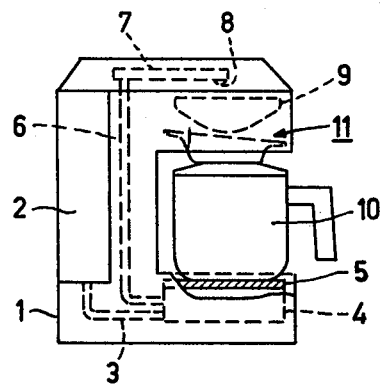

United States Patent [19]

Panneman

[11] 4,174,006
[45] Nov. 13, 1979

[54] FILTERING DEVICE

[75] Inventor: Hendrik Panneman, Groningen, Netherlands

[73] Assignee: U.S. Philips Corporation, New York, N.Y.

[21] Appl. No.: 883,485

[22] Filed: Mar. 6, 1978

[30] Foreign Application Priority Data

Mar. 9, 1977 [JP] Japan .................................. 52/24925

[51] Int. Cl.$^2$ .............................................. B65B 3/06
[52] U.S. Cl. ....................................... 141/87; 99/306; 210/464
[58] Field of Search ...................... 141/86, 87, 88, 98, 141/363-366; 99/295, 304, 306; 210/464, 465, 466, 467

[56] References Cited

U.S. PATENT DOCUMENTS

| 1,675,741 | 7/1928 | Waring | 141/87 |
| 2,874,734 | 2/1959 | Luckock et al. | 141/87 |

Primary Examiner—Houston S. Bell, Jr.
Attorney, Agent, or Firm—Thomas A. Briody; William J. Streeter; Rolf E. Schneider

[57] ABSTRACT

There is provided a coffee maker comprising a housing in which a filter holder can be placed, with a leak tray positionable therebetween. Such leak tray has a discharge outlet for the passage of filtrate into a collecting vessel designed to be brought into contact therewith. When the collecting vessel is arranged in contact with the leak tray, the discharge outlet is disposed at the lowest point of the leak tray. When the collecting vessel is removed from contact with the leak tray, the bottom portion of the leak tray opposite the discharge outlet is situated below the level of such outlet.

6 Claims, 6 Drawing Figures

FILTERING DEVICE

This invention relates to a filtering device, such as a coffee maker, comprising a housing in which a filter holder can be placed, and a leak tray underneath the filter holder, which tray can be replaced by a collecting vessel.

Such a filtering device is known from German "Gebrauchsmuster" No. 69 19 363 filed May 13, 1969 and granted Nov. 20, 1969.

A problem associated with such devices is filtrate dripping from the filter after the collecting vessel has been removed. As a result of this the device and in particular its heating plate, if any, may be soiled. Moreover, the filtrate may leak along such heating plate into the housing underneath the heating plate and cause a short-circuit between electrical components.

In the above-mentioned prior art device this problem is solved by means of a horizontally movable leak tray. When the collecting vessel is placed underneath the filter holder the leak tray is bodily pressed away from the filter holder against a spring force, so that the filtrate can flow into the collecting vessel. When the collecting vessel is removed the leak tray resumes its position underneath the filter holder under the influence of the spring force, so that drops of filtrate which drip from the filter are then collected in the leak tray.

It is the object of the present invention to provide a different solution to this problem. The filtering device in accordance with the invention is therefore characterized in that the leak tray has at least one discharge opening for the passage of filtrate, which leak tray by placing the collecting vessel in the device can be brought into a filtering position in which the leak tray is supported by the collecting vessel, the discharge opening of the leak tray being located at its deepest point, and which leak tray when the collecting vessel has been removed is in a position in which a bottom portion of the leak tray is situated below the level of the discharge opening.

Preferably, when the collecting vessel has been removed, a rim of the leak tray is supported by an edge of an opening in the housing.

A preferred embodiment of the filtering device in accordance with the invention is characterized in that the rim of the leak tray has a recess at the location of said bottom portion, and the housing of the device has a vertically extending longitudinal cam which engages with the recess of the leak tray.

A further embodiment of the filtering device in accordance with the invention is characterized in that said bottom portion and the discharge opening of the leak tray are opposite each other and the height of the side wall of the leak tray at the location of said bottom portion is greater than that at the location of the discharge opening.

Another embodiment is characterized in that the thickness of the bottom of the leak tray increases from the discharge opening towards said bottom portion.

Still another embodiment is characterized in that the leak tray has a handle for removal of the leak tray from the device. Preferably, the handle takes the form of a vertical partition, which is arranged on the bottom of the leak tray.

Figure 2:
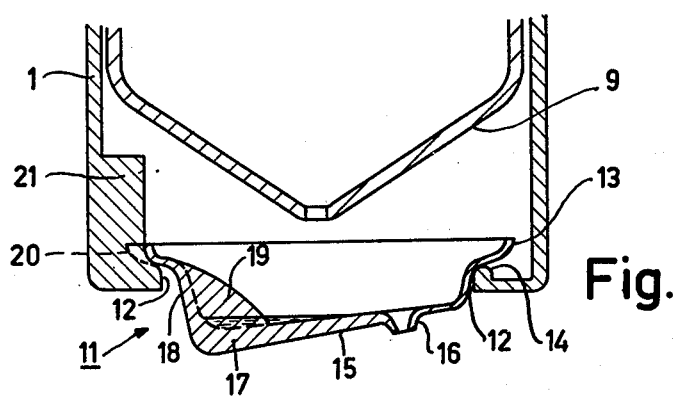
Figure 3:
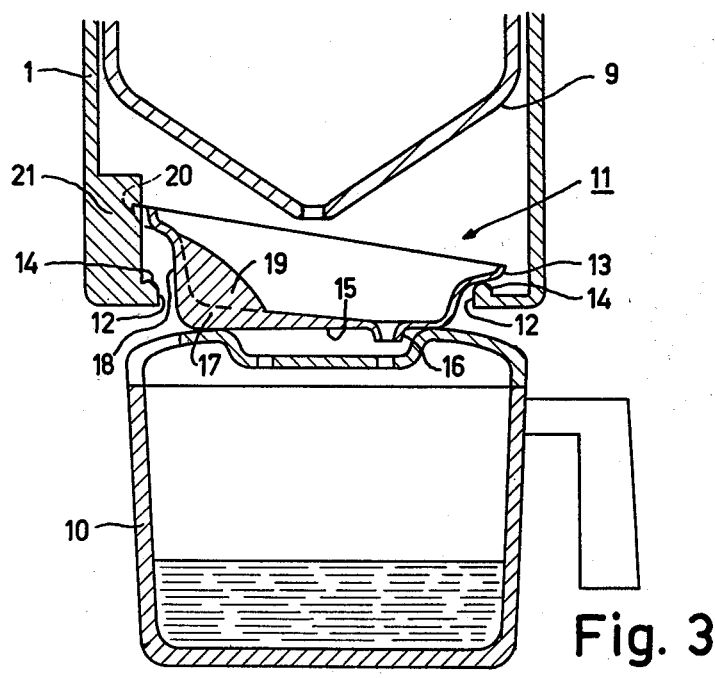
Figure 4:
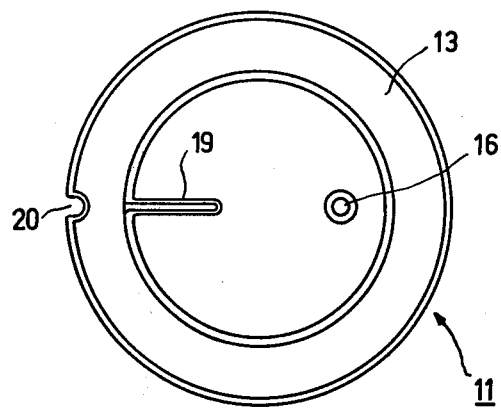
Figure 5:
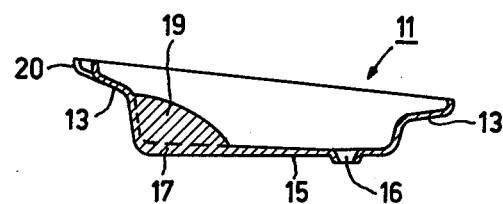
Figure 6:
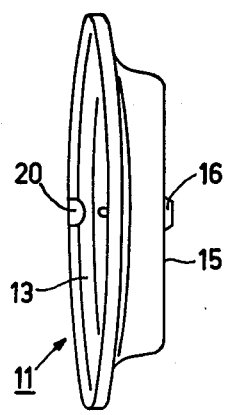

The invention will now be described in further detail in connection with the accompanying drawings, in which:

FIG. 1 is a schematic view, partially in cross-section of a coffee maker embodying the invention, FIG. 2 is a partial cross-sectional view of the coffee maker of FIG. 1 with the leak tray in accordance with the invention in a position in which the collecting vessel has been removed from the coffee maker, FIG. 3 is a partial cross-sectional view of the coffee maker shown in FIG. 1, with the coffee pot in position, FIG. 4 is a plan view of the leak tray in accordance with the invention, FIG. 5 is a cross-sectional view of the leak tray of FIG. 4, and FIG. 6 is a perspective view, turned 90° clockwise, of the leak tray of FIG. 4.

In FIG. 1 the reference numeral 1 designates the housing of the coffee maker. The housing accommodates a water reservoir 2, a discharge conduit 3, a flow heater 4 with a heating plate 5, a riser pipe 6, and an outlet pipe 7, which is rotatably connected to the riser pipe, having an outlet opening 8. The housing furthermore accommodates a filtering device, comprising a detachable filter holder 9. A coffee pot or vessel 10 for collecting the filtered coffee brew can be placed on the heating plate 5 underneath the filter holder.

Underneath the filter holder 9 there is provided a leak tray 11. As is shown in FIG. 2, the leak tray is placed in a recess or opening 12 of the housing 1. The leak tray has a rim 13 which bears on an edge 14 of the housing recess 12 when the collecting vessel 10 has been removed.

In the bottom 15 of the leak tray a discharge opening or outlet 16 is formed for the passage of the filtered coffee brew. When the collecting vessel 10 is placed on the heating plate 5 in the coffee maker, the leak tray is supported by the top of the collecting vessel. In this filtering position (see FIG. 3) the discharge opening 16 is located at the deepest or lowest point of the bottom of the leak tray. In the present example this is achieved by means of an increasing thickness of the bottom from the discharge opening 16 towards the bottom portion 17.

Upon completion of the filtration process, the collecting vessel 10 is removed from the appliance. The leak tray is lowered under the influence of gravity and is positioned in the housing opening 12 in such a way that the bottom portion 17 is situated below the level of the discharge opening 16. In the present example this is achieved in that the height of the side wall 18 at the location of the bottom portion 17 is greater than that at the location of the discharge opening 16. Residual drops of coffee brew dripping from the filter are received by the leak tray and collect in the bottom portion 17.

The leak tray may furthermore be provided with a handle with which the leak tray can be removed from the coffee maker, for example for cleaning purposes. In the present example the handle takes the form of an upwardly extending vertical partition or projection 19.

In the rim 13 of the leak tray a recess 20 may be formed (also see FIG. 4), which engages with a vertical longitudinal cam 21 on the housing 1. This ensures that the leak tray is always positioned in the appliance in the same manner. For the sake of clarity the leak tray is shown separately in FIGS. 4, 5 and 6.

Instead of the leak tray being supported on the edge of the housing recess 12, the leak tray can be mounted in the housing so as to be rotatable. This is for example possible by providing the side wall 18 of the leak tray with two diametrically opposed trunnions, which engage with corresponding half-open bearing cups of the housing. The position of the trunnions should then be selected so that when the collecting vessel is removed the leak tray is tilted in such a way that the bottom portion 17 is situated below the level of the discharge opening 16.

Instead of positioning the leak tray in the housing, the leak tray may be positioned in the filter holder or may be pivotable in the said holder. For this purpose the wall of the filter holder may for example be extended in a downward direction.

What is claimed is:

1. A coffee maker comprising a housing in which a filter holder can be positioned, an opening in said housing beneath the position of the filter holder, said opening having an inwardly extending edge, a leak tray arranged underneath the filter holder position, said leak tray having an outwardly extending rim for resting on the inwardly extending edge of the housing opening, means to permit vertical movement of one portion of the leak tray rim with respect to the opposite portion of said rim, and a discharge outlet in said leak tray adjacent said opposite rim portion for the passage of filtrate into a collecting vessel arrangeable beneath and in contact with said leak tray, said one rim portion of the leak tray being vertically raised when the collecting vessel is in contact with the leak tray, said discharge outlet thereby being located at the lowest point of the bottom of said leak tray, and said one rim portion of the leak tray being vertically lowered when the collecting vessel is removed from contact with said leak tray, the bottom portion of the leak tray adjacent said one rim portion being thereby situated below the level of the discharge outlet.

2. A coffee maker according to claim 1, in which the means to permit vertical movement of said one rim portion of the leak tray comprises a recess at said one rim portion, and a vertically extending longitudinal cam on said housing for engagement with said recess.

3. A coffee maker according to claim 1, in which the height of the side wall of the leak tray adjacent said one rim portion is greater than that adjacent the discharge outlet.

4. A coffee maker according to claim 1, in which the thickness of the bottom of the leak tray increases from the discharge outlet diametrically toward said one rim portion.

5. A coffee maker according to claim 1, in which the leak tray is provided with a handle for removal of the leak tray from the housing.

6. A coffee maker according to claim 5, in which the handle comprises a vertical projection extending upwardly from the bottom of the leak tray.

* * * * *